(No Model.)
S. NACHTIGAL.
MULTIPLE DRILLING MACHINE.
No. 541,381. Patented June 18, 1895.
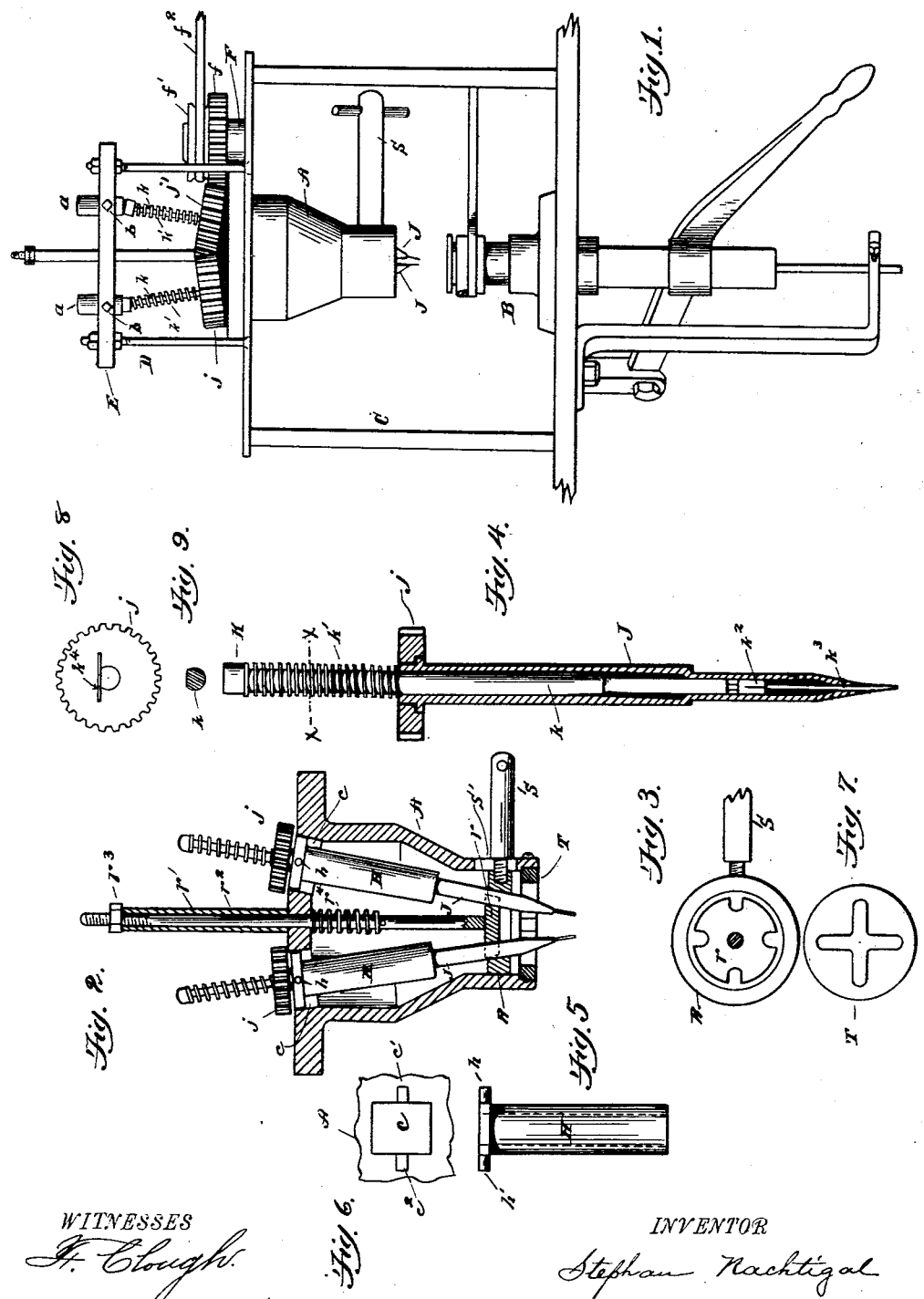
WITNESSES
H. Clough
D. W. Bradford
INVENTOR
Stephan Nachtigal
By Parker & Burton
Attorneys.

UNITED STATES PATENT OFFICE.

STEPHAN NACHTIGAL, OF DETROIT, MICHIGAN, ASSIGNOR, BY MESNE ASSIGNMENTS, TO THE EXCELSIOR BUTTON COMPANY, OF SAME PLACE.

MULTIPLE DRILLING-MACHINE.

SPECIFICATION forming part of Letters Patent No. 541,381, dated June 18, 1895.

Application filed January 21, 1895. Serial No. 535,621. (No model.)

*To all whom it may concern:*

Be it known that I, STEPHAN NACHTIGAL, a citizen of Germany, residing at Detroit, county of Wayne, State of Michigan, have invented a certain new and useful Improvement in Multiple Drilling-Machines; and I declare the following to be a full, clear, and exact description of the invention, such as will enable others skilled in the art to which it pertains to make and use the same, reference being had to the accompanying drawings, which form a part of this specification.

This invention relates to drills and chucks for holding drills, and it applies especially to that form of drill and chuck which is employed for use in boring or drilling holes close together, such as the eye holes of a button, where several holes are required to be drilled in a very limited space, and it is desirable to drill them all together.

In the drawings, Figure 1 shows in elevation the drills and chuck and the button-holding chuck opposed to the end of the drills. Fig. 2 shows a diagonal sectional elevation of the drill-holding chuck. Fig. 3 shows in plan the adjusting device by means of which the drills are contracted or spread. Fig. 4 shows in section a single drill with the attachments by which it is held and revolved in the general chuck. Fig. 5 shows on a larger scale a sleeve through which the drill-holder is passed in the chuck. Fig. 6 is a plan view of the opening in the chuck-casing through which the sleeve of Fig. 5 is inserted. Fig. 7 is a plan view of the guide-plate at the lower end of the casing. Fig. 8 is a plan view of the head of the tubular outer drill-stock in which the drill-stock proper is held. Fig. 9 is a cross-section of the drill-stock at the line $x\ x$ of Fig. 4.

A indicates an outer casing held by any suitable frame work; and opposed to this casing is the work holding chuck B. Both of these parts are held in position by a frame-work C, and from the frame-work C is erected a second frame D provided with a bearing plate E, through which are a number of pins $a\ a$, adjustable toward and away from the chuck case A, and held in their adjusted position by set screws $b\ b$. On the frame-work C is a stud F, on which are a gear wheel $f$, and a driving pulley $f'$. Motion is communicated to the driving pulley through a belt $f^2$ from any convenient source of power.

Through the chuck casing A are a number of appliances adapted to hold the drills, and these are in number equal to the number of holes which are to be drilled in any single article. For ordinary buttons, there would be four such drills, but the chuck shown in the drawings is adapted for either two or four drills.

At that end of the chuck which is nearest the work, the opening in the casing is provided with the guide plate T. At the opposite end, the casing is provided with four rectangular holes, one of which is indicated at $c$ in Fig. 6. At the sides of the rectangular hole $c$, are bearings $c'$ and $c^2$ for the pins or trunnions $h\ h'$ on sleeve H. The holes are so disposed that their axes are radial to the center of the end of the casing, and the trunnion bearings $c'$ and $c^2$ are at right angles to such radial lines.

The sleeve H swings on the trunnions $h$ and $h'$ in a plane that is radial to the axis of the chuck casing. Through each sleeve is placed a tube J that is drawn nearly to a point at the lower end, and formed with a square opening through which the drill passes. At the upper end it is provided with a gear wheel $j$.

Through the tube is inserted the drill stock $k$, which is provided at its lower end with means for holding the square steel drill $k^3$. This means consists simply of the saw kerf $k^2$, and an opening slightly smaller than the drill rod, into which the end of the wire may be forced. This form of holding device is commonly known as a split chuck, and in the form shown in the drawings the ordinary split chuck is used without the contracting sleeve sometimes employed with split holders. The stock $k$ extends above the pinion $j$, and terminates with a head and collar K, and between the collar and the pinion $j$ is a coiled spring $k'$, the tendency of which is to retract the stock $k$ and the drill $k^3$ toward the point of the outer tube J.

The head K, when in the chuck in position to work, bears against the pin $a$, and the entire drill and drill chuck is held by the pin $a$ and the spring $k'$ and the tube J, in its position in the casing. The drill stock $k$ revolves with the tube J with which it engages, either with a feather or with some similar means of engagement. The means of engagement is brought about in the present instance by flattening one side of the drill stock its entire length and placing a cross key $k^4$ in a notch fitted to receive it in the pinion $j$.

Toward the lower or work end of the casing is located the means for adjusting the drills with respect to each other. This means consists of a ring R, which surrounds all the tubes J of the set, and a notched spreader $r$, which is located between the several tubes J of the set, and has in each one of the several notches a passage-way for the engagement of the tube J. The spreader $r$ is a head formed at the end of a stem $r'$ that extends upward beyond the casing A and through the holding plate E of the secondary frame. Between the casing A and the exterior end of the stem $r'$ is a sleeve $r^2$, and on the end of the stem is a nut $r^3$. Within the casing A, and surrounding the stem $r'$, is a coiled spring $r^4$, arranged to give to the stem $r'$, and to the head $r$, a downward thrust, the amount of which thrust is limited by the position of the nut $r^3$.

To the ring R is affixed a set screw S that extends through a slot S' in the case A, and is provided at its outer extremity with a cross head or wings, by means of which it can be turned. The set screw S also serves as a handle to enable the operator to locate the ring R, enabling him to move at will either toward the drill points or away from them. Thus, by the joint movement of the spreader $r$ and the ring R, the several drills may be spread or contracted at their points, as the operator may desire. The several pinions $jj'$ mesh into one another, and into one of them meshes the pinion $f$ which is on the shaft with and fast to the driving pulley $f'$.

The square form of the drill serves to keep the drill sharp for a much longer period than any other form that I have been able to find, and also serves, in case any one of the drills is broken, to furnish a fresh drilling point without removing the drill from its place or resharpening it, although of course with constant work the drills become dulled by wearing off at the edges faster than they do at the center. Still, the square drill will work for a long period of time, producing successful results without sharpening, and in case any one of the several drills is broken, it is only necessary to push the drill stock far enough down to bring the remaining part of the drill to the same plane as the drills in use, and this is done readily by loosening the set screw $b$, forcing the pin $a$ down the proper distance and again tightening the set screw $b$.

Having thus described my invention, what I claim is—

1. In a multiple drill, the combination of the drill casing, a drill stock mounted in a revoluble drilling tube and adapted to be forced therethrough while in motion, a guiding sleeve for said drilling tube pivoted at one end and free to swing at the other and means for swinging said guiding sleeves around the pivot whereby the drills are adjusted toward and away from each other, substantially as described.

2. In a multiple drill, in combination with the casing and a plurality of drills independently revoluble therein, a fillet interposed between said drills, and an embracing ring adapted to co-act with said fillet to adjust the drill points toward and away from each other, substantially as described.

3. In a multiple drill, the combination of a casing, a plurality of drills pivotally suspended from the upper wall and within said casing, means for simultaneously rotating said drills, adjustable pins for regulating the longitudinal movement of said drills, a fillet interposed between said drills within the casing, means for operating said fillet from without the casing, an embracing ring within the casing adapted to co-act with said fillet whereby the drill points are adjusted toward and away from each other and means for operating said embracing ring from without said casing, substantially as described.

In testimony whereof I sign this specification in the presence of two witnesses.

STEPHAN NACHTIGAL.

Witnesses:
J. M. CLOUGH,
C. F. BURTON.